Feb. 7, 1939.  R. W. JOY  2,146,299
LIGHT AND LOAD BRAKE
Filed Feb. 17, 1937  8 Sheets-Sheet 1
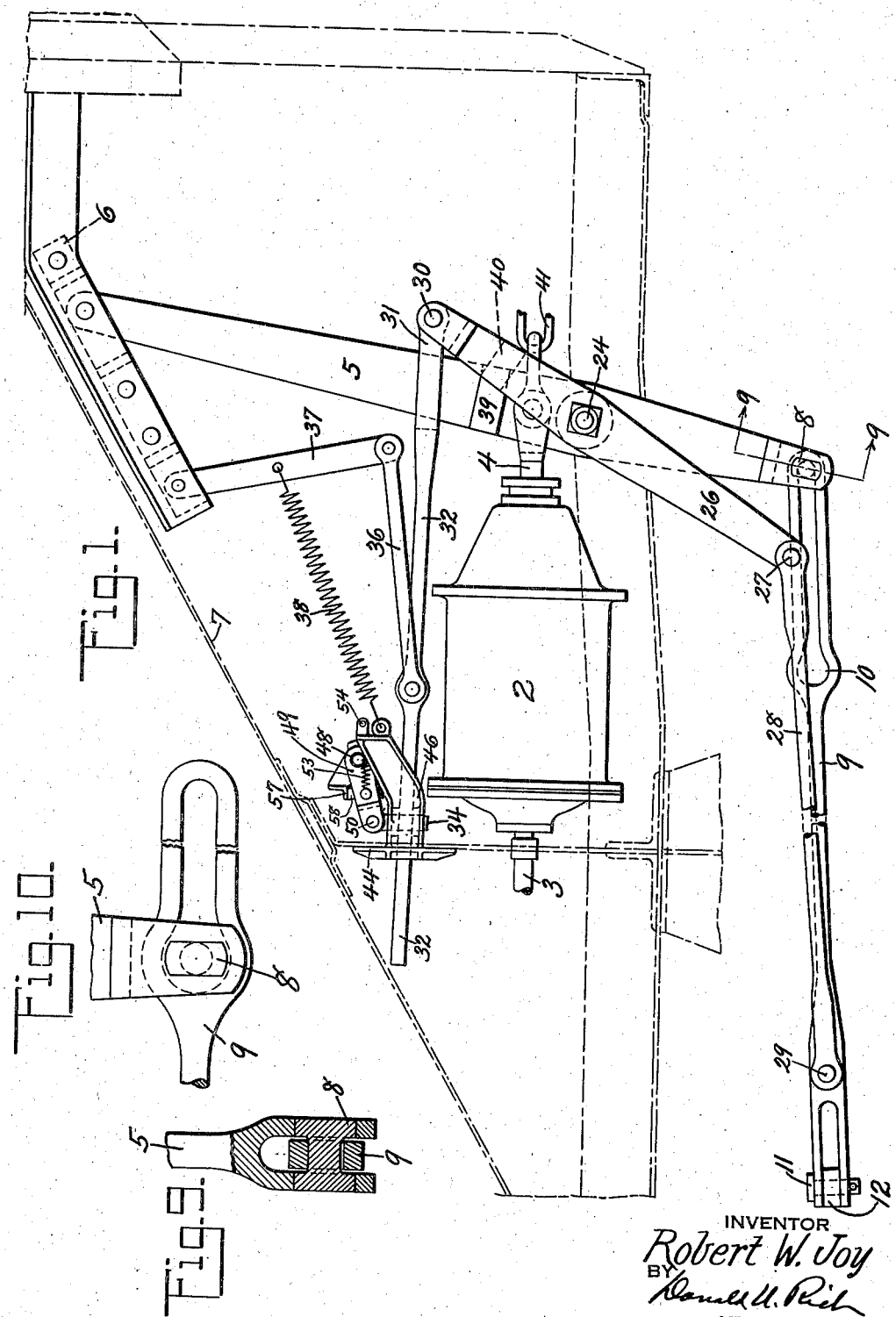
INVENTOR
Robert W. Joy
BY
ATTORNEY

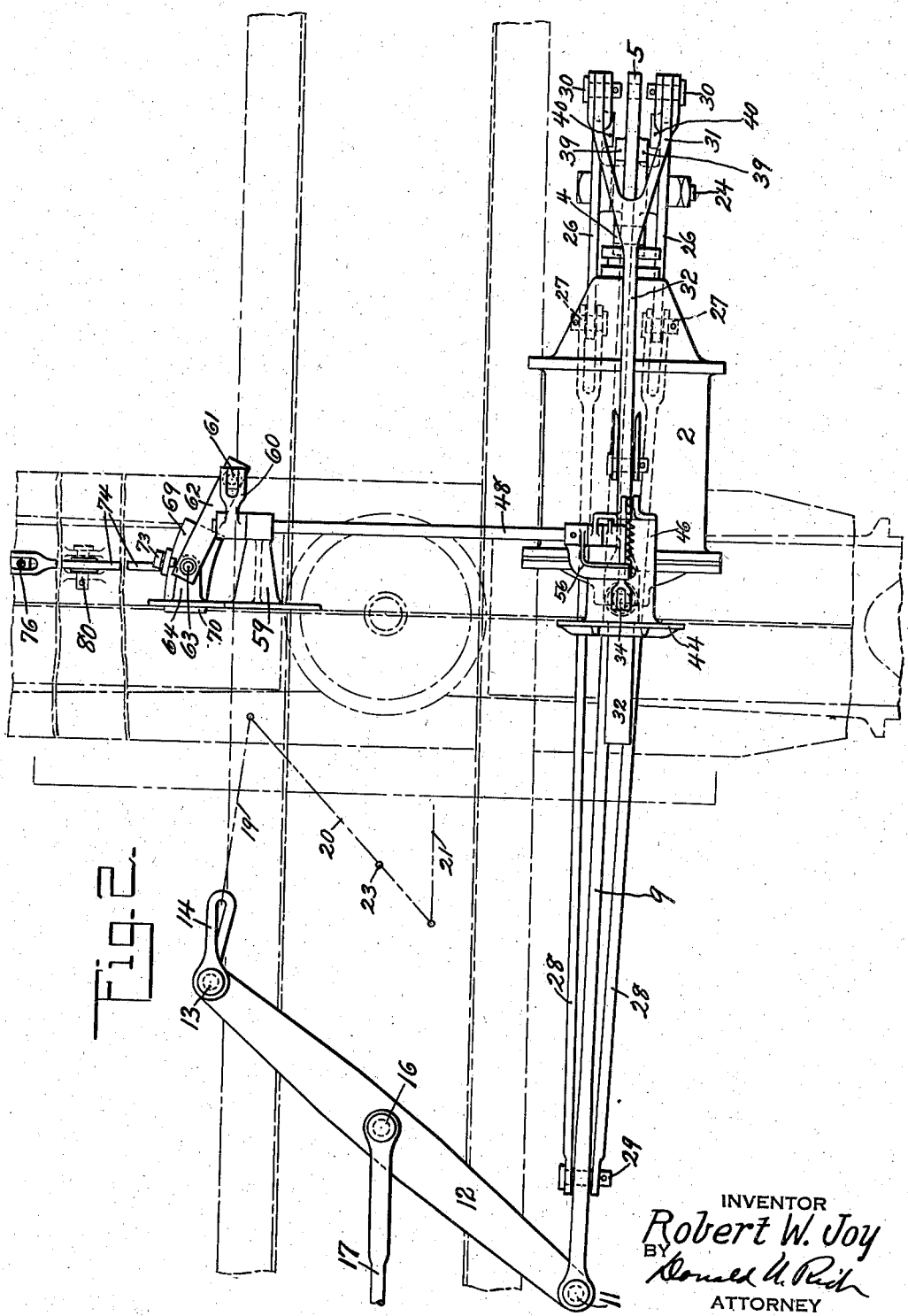

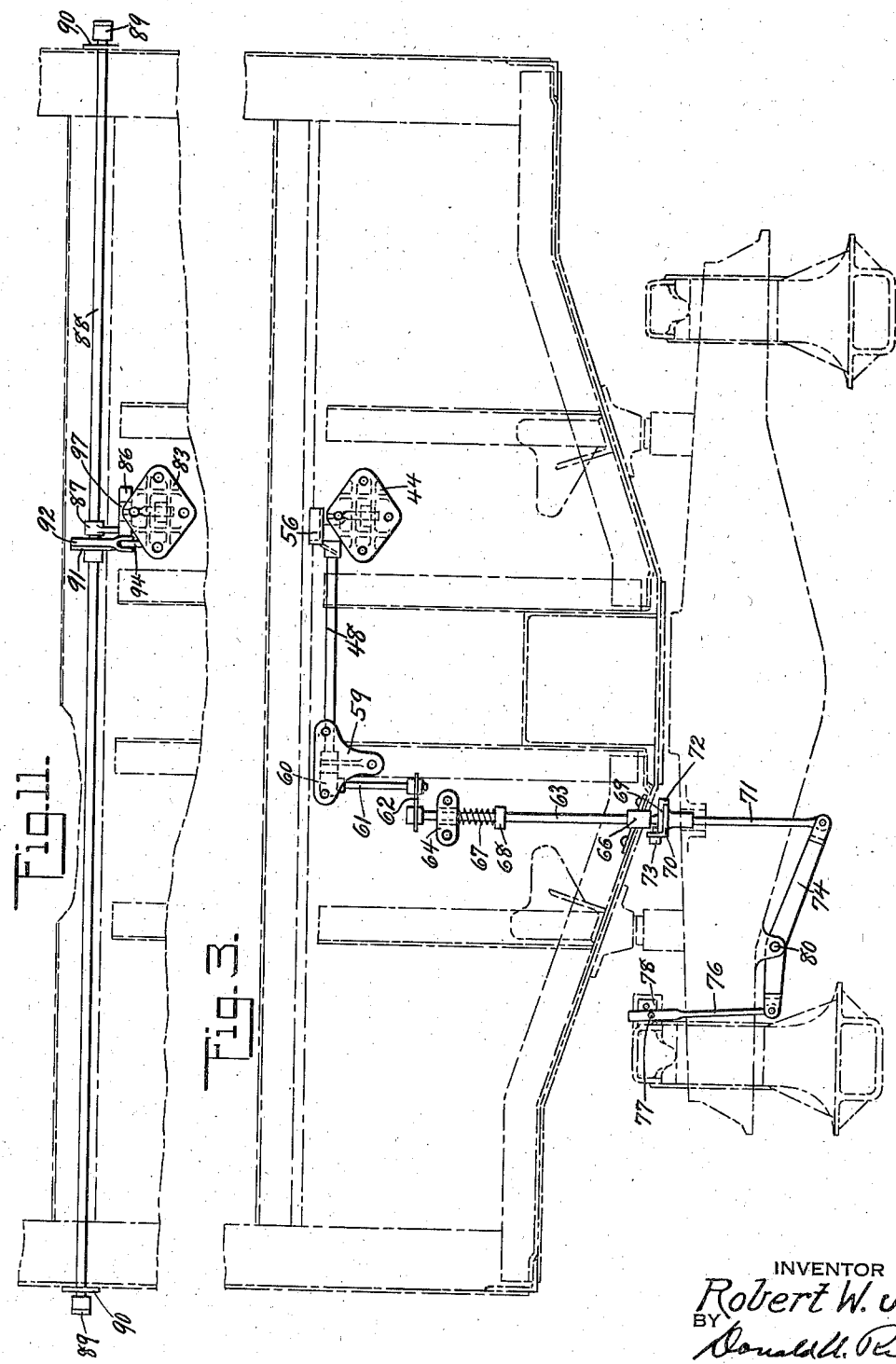

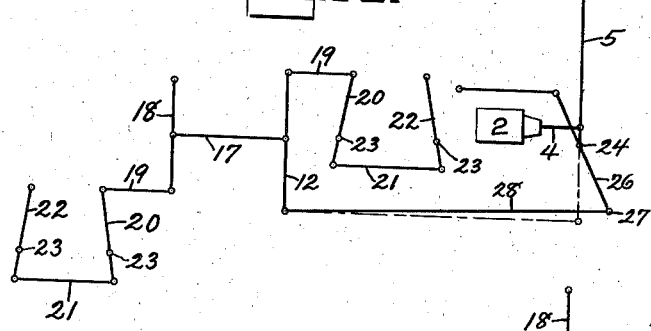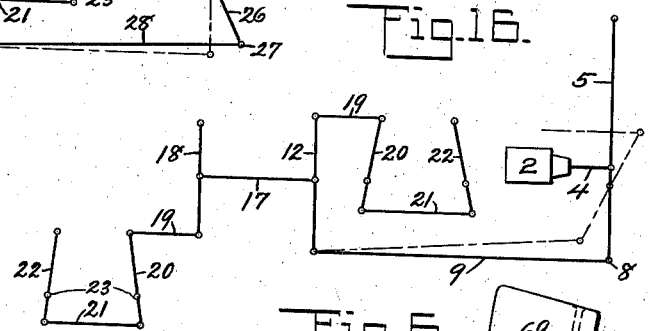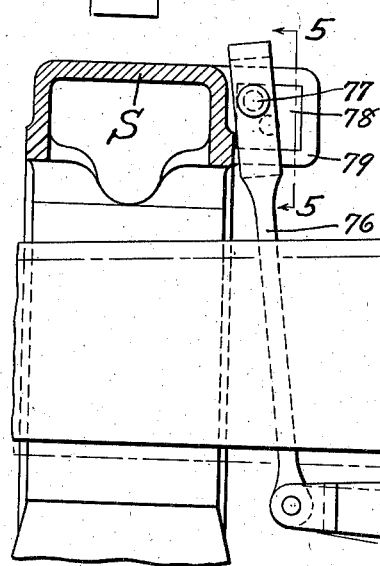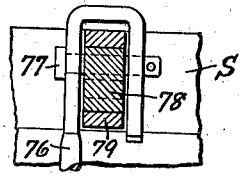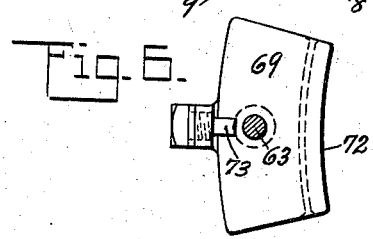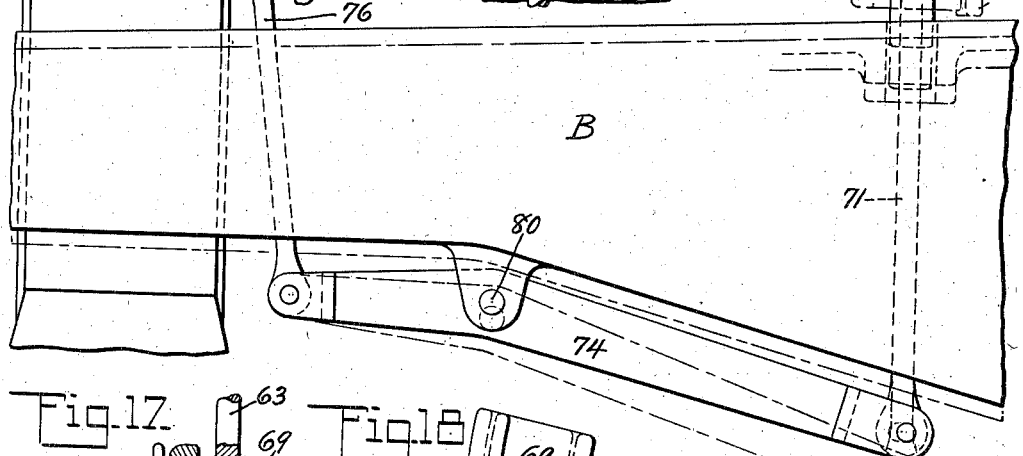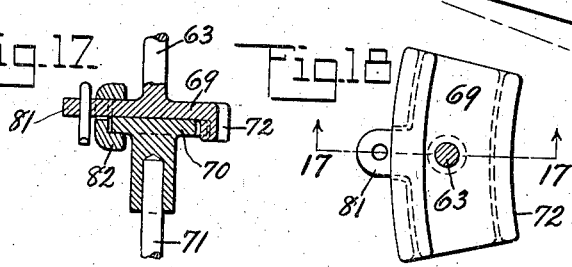

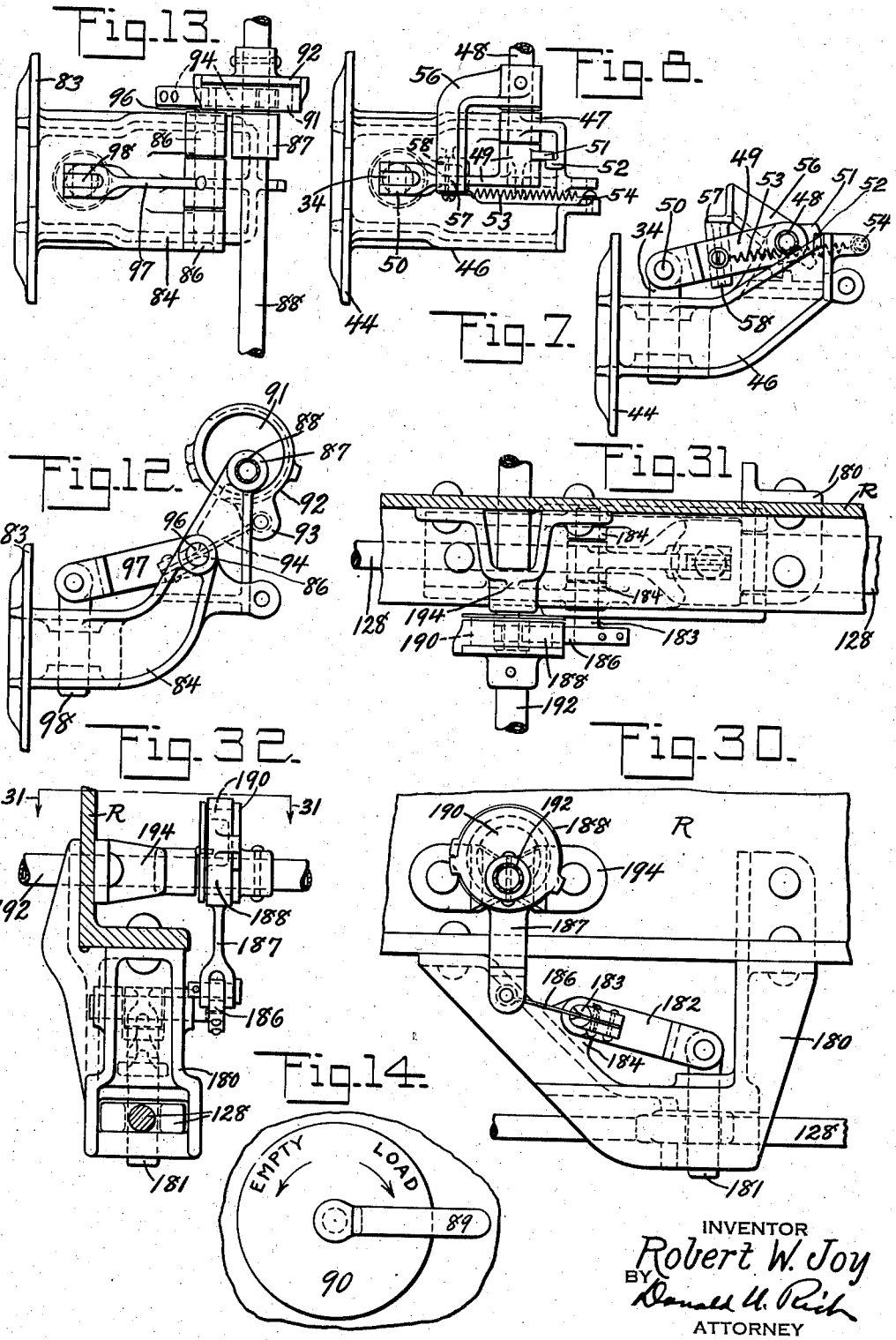

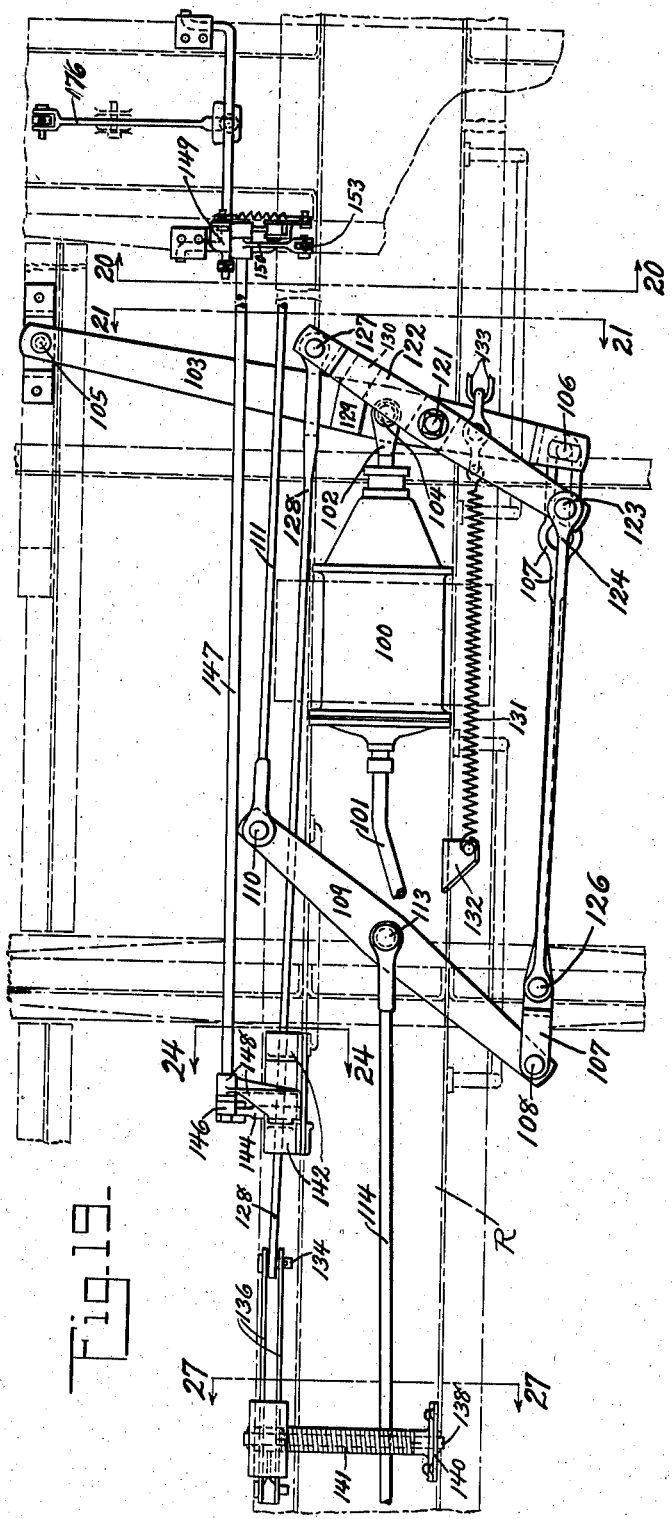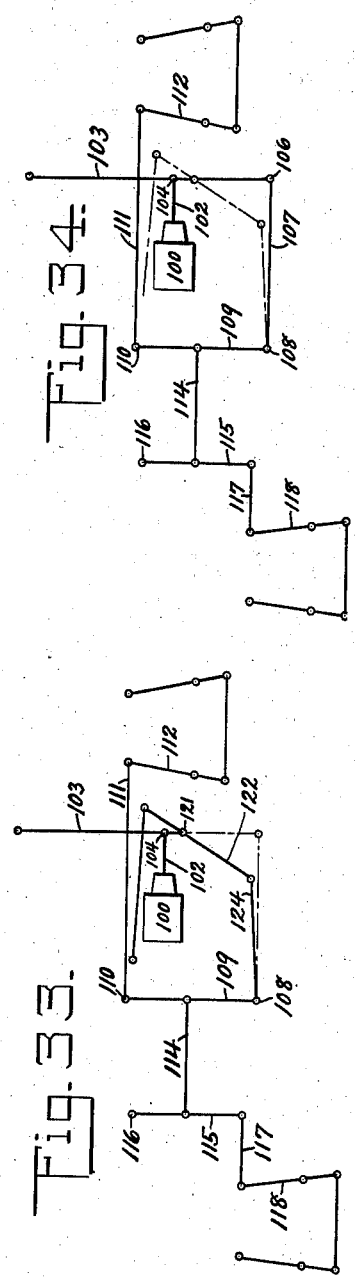

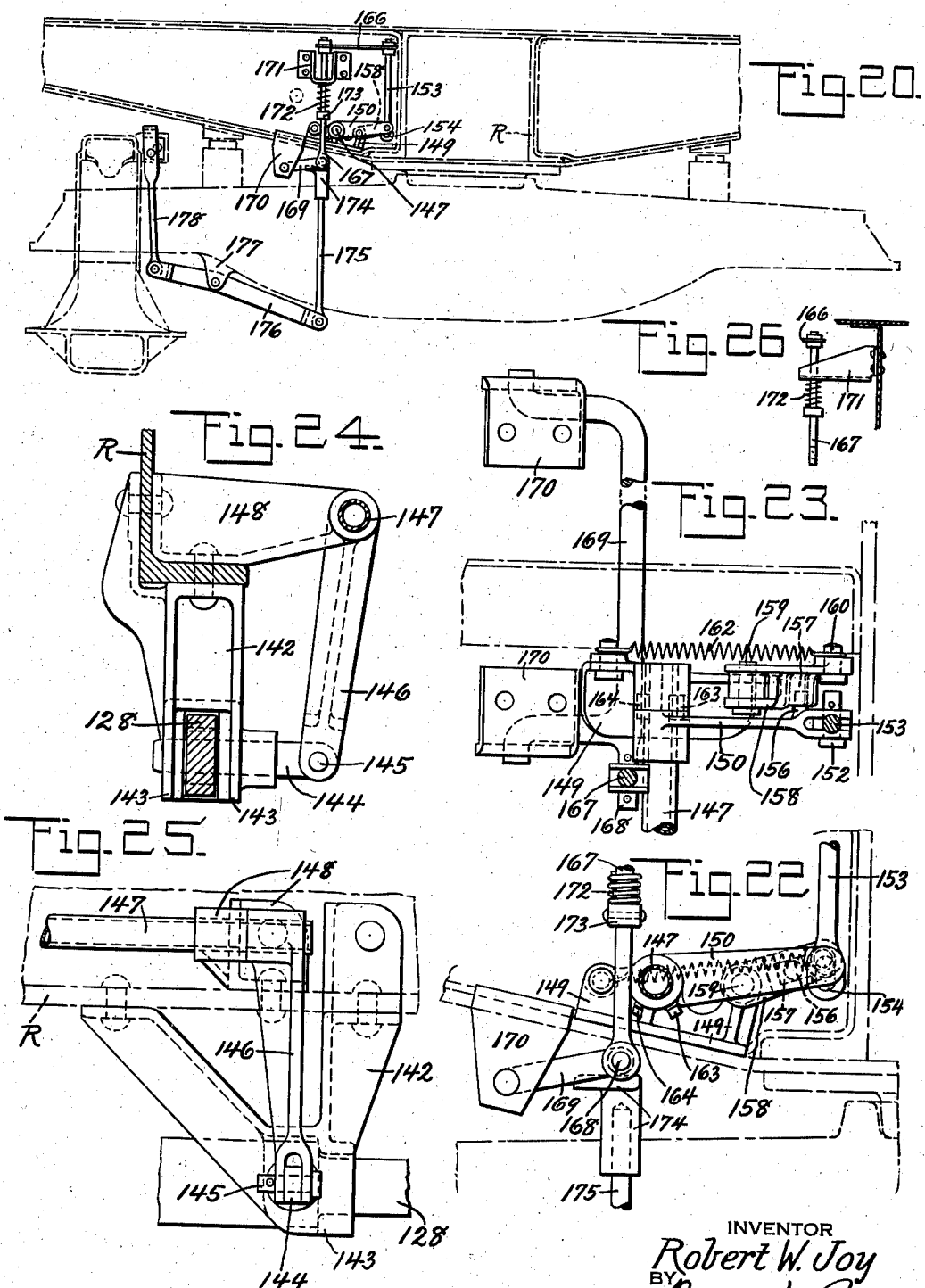

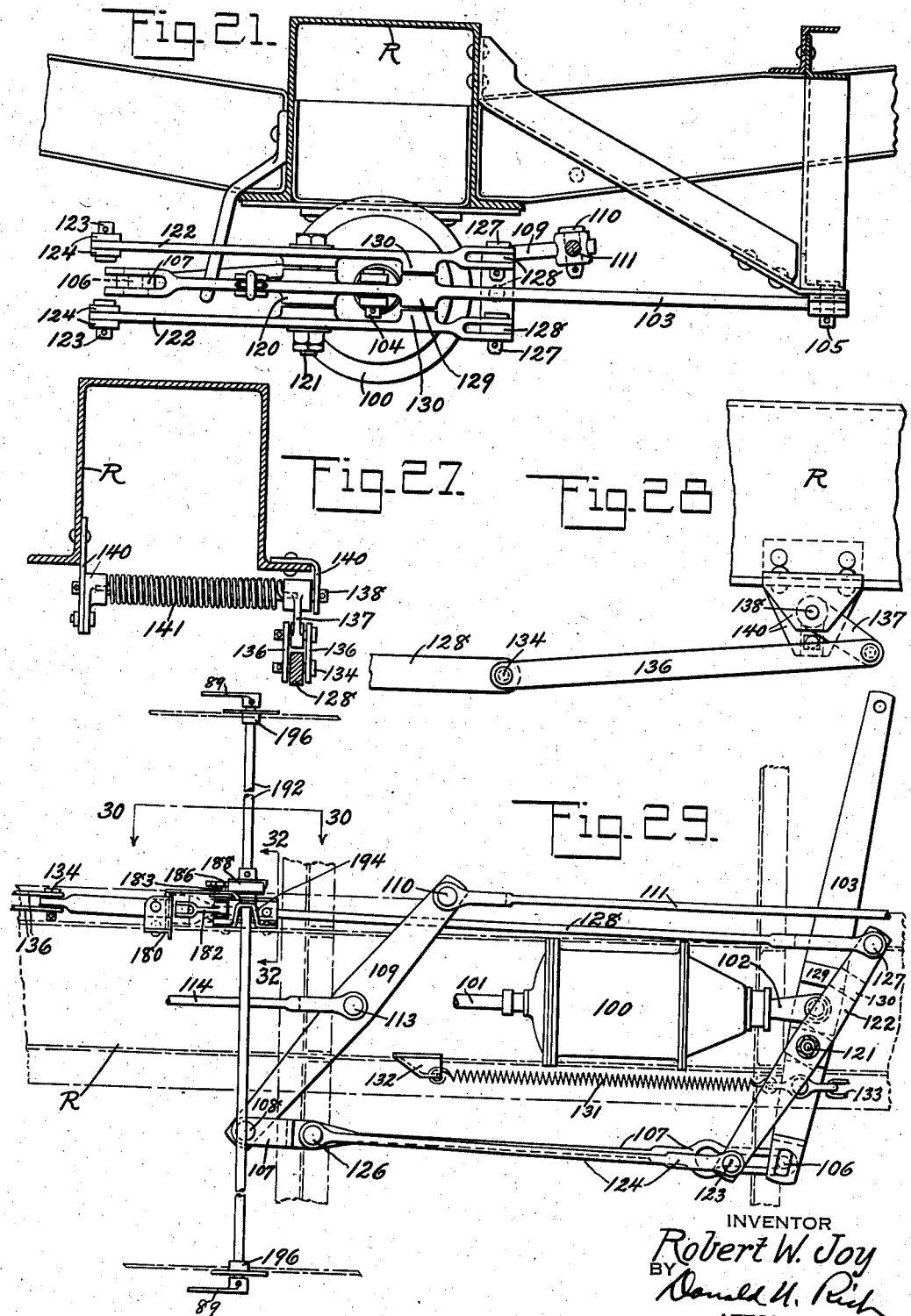

Patented Feb. 7, 1939

2,146,299

UNITED STATES PATENT OFFICE 2,146,299

LIGHT AND LOAD BRAKE

Robert W. Joy, Berwick, Pa., assignor to American Car and Foundry Company, New York, N. Y., a corporation of New Jersey Application February 17, 1937, Serial No. 126,117

23 Claims. (Cl. 188—195)

This invention relates to brakes in general and in particular to brakes for freight cars wherein the difference in the car weight is great between empty and loaded conditions.

In the operation of present-day trains it is imperative that maximum braking power be available at all times and since certain cars in a train will be loaded and certain cars empty it has been necessary in the past for the engineer to apply his brakes in such a manner as to safeguard the empty cars. It is obvious that if a maximum braking power is obtained with a loaded car, then if this same power be applied when the car is empty, the wheels would slide on the rail reducing the braking action and damaging the wheel. Previously systems have been proposed wherein a plurality of brake cylinders are used each operating under certain conditions to apply its power to the braking system, but such installations are extremely expensive, often amounting to nearly one-third the cost of the entire car. It is an object, therefore, of the invention to provide a light and load brake using a single power cylinder to which a source of constant pressure is connected.

Another object of the invention is the provision of a light and load brake in which change in power transmitted to the brakes is obtained by a system of levers.

A further object of the invention is the provision of a light and load brake system using a plurality of levers and in which the movements of certain levers may be automatically controlled dependent upon the condition of the truck springs.

A still further object of the invention is the provision of an automatic light and load brake in which certain levers are controlled by mechanism dependent upon the normal truck spring movement but which is independent of the vibrations of the truck springs.

A yet further object of the invention is the provision of a light and load brake of the mechanical type in which certain levers may be controlled by a mechanism, parts of which may be conditioned for a control movement without effecting final control of the levers until application of power has been removed from the brake system.

These and further objects of the invention will be apparent to persons skilled in the art from a study of the following description and accompanying drawings, in which:

Figure 1 is a side view showing the invention applied to a hopper car;

Fig. 2 is a plan view of the mechanism shown in Fig. 1;

Fig. 3 is an end view showing the automatic control mechanism;

Fig. 4 is an enlarged view showing the connection of the automatic mechanism to the truck side frame and bolster;

Fig. 5 is a detail sectional view taken on line 5—5 of Fig. 4 and showing the improved adjusting block;

Fig. 6 is a sectional plan view taken on line 6—6 of Fig. 4 and showing the slide connection between the truck and body carried pull rods;

Fig. 7 is an enlarged side view of the approved automatic locking means;

Fig. 8 is a plan view of the locking mechanism shown in Fig. 7;

Fig. 9 is a sectional view taken on line 9—9 of Fig. 1;

Fig. 10 is an enlarged view showing the manner of connecting the levers shown in Figs. 1 and 9;

Fig. 11 shows a slight modification in which the locking mechanism is manually controlled;

Fig. 12 is a side view of the manual locking mechanism shown in Fig. 11;

Fig. 13 is a plan view showing the lever locking mechanism of Fig. 11;

Fig. 14 is a side view showing the manual control lever and indicating plate carried by the car side;

Fig. 15 is a brake diagram indicating the connection of parts under light load conditions;

Fig. 16 is a brake diagram showing the connection of parts under loaded car conditions;

Fig. 17 is a sectional view taken on line 17—17 of Fig. 18;

Fig. 18 is a sectional plan view of the slide block and is a modification of the block shown in Fig. 6;

Fig. 19 is a plan view of a slightly modified form as applied to freight cars of the box or gondola type;

Fig. 20 is an end view showing the automatic control mechanism and taken on line 20—20 of Fig. 19;

Fig. 21 is an end view showing the arrangement of cylinder levers and taken on line 21—21 of Fig. 19;

Fig. 22 is an enlarged end view of the lock operating member shown in Fig. 20;

Fig. 23 is an enlarged plan view of the lock operating member shown in Fig. 22;

Fig. 24 is a sectional view taken on line 24—24 of Fig. 19 and shows the lever locking pin;

Fig. 25 is a side view of the lever locking pin shown in Fig. 24;

Fig. 26 is a detail view showing the supporting bracket carried by the car bolster;

Fig. 27 is a sectional view of the lever return mechanism taken substantially on line 27—27 of Fig. 19;

Fig. 28 is a side view showing the lever return mechanism of Fig. 27;

Fig. 29 is a plan view similar to that shown in Fig. 19 but disclosing the control mechanism as modified for manual operation;

Fig. 30 is a sectional view taken on line 30—30 of Fig. 29;

Fig. 31 is a sectional view taken substantially on line 31—31 of Fig. 32;

Fig. 32 is a sectional view taken on line 32—32 of Fig. 29 and discloses the manual operating mechanism;

Fig. 33 is a brake diagram showing the lever connections of the system disclosed in Figs. 19 and 29 when the car is in light load condition, and Fig. 34 is a brake diagram similar to Fig. 33 but disclosing connections when the car is loaded.

Reference is now had to the drawings, particularly Figures 1 to 18 inclusive for a detailed description of the invention as adapted for use on hopper cars. The brake system as shown consists of a brake cylinder 2 connected by a pipe 3 with a source of substantially constant pressure as is customary. This cylinder is provided with the usual piston and push rod 4 which is connected by a pin or other means to main cylinder lever 5 fulcrumed at its upper end upon a casting or forging 6 secured to the car framing beneath the slope sheet 7. The lower end of this lever is bifurcated and provided with an elongated opening adapted to receive the head portion 8 of a pivot pin. The central portion of this pivot pin is circular and adapted to be engaged by the spaced parts of the slotted load connection rod 9. The load connection rod is provided at the inner end of the slot with an enlarged portion 10 through which the head portion of the pivot pin may be inserted during assembly of the main cylinder lever and load connection rod. It is thus obvious that with the lower end of the main cylinder lever opposite the enlarged portion of the slot the pivot pin may be inserted, after which the cylinder lever may be moved back into the narrow portion of the load connecting rod slot, thus retaining the pivot pin in position without the necessity of utilizing any separate securing means. The inner end of the load connection rod is bifurcated and pivoted as at 11 to one end of car equalizer lever 12; the other end of the car equalizer lever is connected at 13 to a clevis or other means 14 which is in turn connected to the truck braking system at the one end of the car. The central portion of the car equalizing lever is pivoted as at 16 to one end of center connecting rod 17, the opposite end of which is pivotally connected to the intermediate portion of car fulcrum lever 18 (see Figs. 15 and 16). One end of this car floating fulcrum lever is pivoted to the car body, while the other end is pivoted to top connection pull rod 19 which is in turn secured to the upper end of live lever 20 carried on the truck. This lever as is customary is connected by bottom connection rod 21 to the dead lever 22. The clevis 14 carried by the car equalizing lever is connected by an almost identical system to the levers on the truck at the opposite end of the car and consequently similar reference numerals have been used in Figures 15 and 16. The live and dead levers carry the brake shoes at some suitable point, such as 23. It is thus seen that the system so far described is very similar to the conventional brake system now in use. The main cylinder lever is formed at some intermediate point with a thickened portion through which the pivot bolt or pin 24 may be inserted. This pivot pin is of sufficient length to extend on either side of the main cylinder lever and pivotally carry a pair of auxiliary cylinder levers 26. The lower ends of these levers are pivotally connected as at 27 to one end of light load connection rods 28, the other end of which is pivoted as at 29 to the load connection rod. The upper ends of these auxiliary cylinder levers are bifurcated and pivoted as at 30 to spaced arms 31 of anchor rod 32. The inner end and intermediate portion of the anchor rod is provided with an opening adapted to receive a locking pin 34, the control of which will be described later. In order to constantly urge the anchor rod inward toward the car body a pair of bars 36 are pivoted at one end to the rod, while the other ends are pivoted to the lower end of a swing link 37, the upper end of which is pivoted to the car body. A spring or other tension means 38 has one end connected to the swing link, while the opposite end is anchored in some manner to the car body. In order to prevent interference between the auxiliary cylinder levers and the main cylinder lever during relative movement thereof pads 39 and 40 are formed on the main cylinder and auxiliary cylinder levers respectively. The customary hand brake rigging may be connected to the system by means of chain as indicated at 41 in Figure 1.

From a study of the linkages just described it is seen that if the anchor rod is held, then the pivot 27 will move at a faster rate than pivot 8, thus giving reduced leverage in the brake system, while if the anchor rod is not held, then the braking power will be transmitted directly through the main cylinder lever. It is, therefore, only necessary to provide some means of controlling the anchor rod in order to obtain a mechanical system having various leverage ratios and these ratios may be changed as is obvious by proper selection of the various pivot points.

In order to provide for proper control of the anchor rod a casting is provided having faced portion 44 by means of which it may be secured to the bolster web and with rearwardly extending box-like portion 46 forming a slide for guiding the anchor rod and through which the locking pin 34 previously mentioned may be inserted. The rear portion of this casting is formed with an upstanding bearing lug 47 through which pin controlling rod 48 may be inserted. This rod is extended beyond the bearing portion to rotatably carry thereon one end of arm 39, the other end of which is pivoted as at 50 to the locking pin (Figs. 7 and 8). The portion of the arm pivoted on the pin controlling rod is formed with an outstanding lug 51 which will engage lug 52 extending upwardly from the casting, thus securing the arm in position upon the casting. In order to hold the arm and locking pin in either a raised or lowered position a spring 53 has one end secured to the arm, while the other end is secured as at 54 to a lug formed on the casting. This spring is so arranged with respect to the pivot point of the arm that during the movement of the arm it must pass beyond the pivot, thus giving a snap toggle action completing the movement of the arm. In order to start movement of the arm a control bracket 56 is non-rotatably secured to the pin controlling rod and formed with spaced apart upper and lower fingers 57 and 58 respectively. These fingers embrace the arm and are spaced apart a sufficient distance to permit a considerable movement of the arm under action of the spring independent of the fingers. This spacing of the fingers also will permit a slight oscillation of the pin controlling rod without effecting any movement of the pin control arm, which oscillation is necessary as will be explained later.

The pin controlling rod is extended from this casting substantially parallel to the bolster web and has the opposite end carried in bearing bracket 59 secured to the bolster. The rod extends beyond this bearing bracket and has non-rotatably secured thereto a bell crank 60 which is connected by means of a pull link 61 to one end of vibrating spring 62, the other end of which is connected to the upper end of a pull rod 63. This pull rod is mounted on the car bolster by brackets 64 and 66 respectively which insure a vertical movement of the rod relative to the car body. A compression spring 67 is inserted between bracket 64 and a stop 68 formed on the rod. The lower end of pull rod 63 is connected to a bearing pad 69 adapted to have sliding movement on a corresponding bearing pad 70 secured to the upper end of truck carried pull rod 71. In order to prevent vertical separation of the bearing pads the pad 69 is provided with a depending lip portion 72 adapted to engage under the bearing portion 70, while the bearing portion 70 is provided with an upstanding lug through which retaining dog point bolt 73 (Figs. 4 and 6) extends to additionally secure the bearing pads from separating. The pull rod 71 preferably extends through the truck bolster B and is pivoted at its lower end to one end of bolster carried lever 74, the other end of which is pivotally connected to the lower end of tension rod 76, the upper end of which is pivotally connected as at 77 to an adjusting block 78 carried by a bracket 79 cast integral with the truck frame S. The intermediate portion of the lever 74 is pivoted to the truck bolster as at 80 in order that the bolster movements may be imparted to the system of pull rods and bell cranks just described. The bolster ends are carried as is customary and well known upon suitable springs which permit a relative vertical movement between the truck frame and bolster. Since in car construction the springs will vary slightly in capacity and since various thicknesses of shims are required at the bolster center plate, it is necessary that the controlling linkage just described may be readily adjusted to compensate for inequalities of materials and workmanship and in order to accomplish this the square adjusting block 78 is provided with one or more openings through which the pivot pin 77 may be inserted. It is obvious that by changing the position of the adjusting block the position of the pivot pin may be controlled any desired amount.

The operation of the control mechanism is as follows and assuming the car to be in an empty or light load condition in which the locking pin is in engagement with the anchor rod as shown in Figure 1: As the car is loaded the truck bolster moves downwardly thus applying a tension in the pull rods 71, 63 and 61 causing the rotation of the pin controlling rod 48 in a clockwise direction as seen in Figure 1, thus causing finger 58 to lift the pin control arm 49. If the load is sufficient this finger will continue its movement until spring 53 has passed the center of the pivot, after which it will snap the pin control arm upward quickly against the upper finger 57 and release the anchor rod 32. In case the car is being loaded at the siding with the brakes set the locking pin, of course, could not be raised but the control system would not be injured by the shift in the car body since this shift would be absorbed by the vibrating or safety spring 62, but as soon as the car was ready to be moved the brakes would be released and as soon as released the energy stored in the spring would immediately lift the pin releasing the anchor rod and conditioning the loaded car for maximum brake application. The spring 62 and the movement permitted by spaced fingers 57 and 58 insure that vibrations of the truck bolster while the car is in transit will not effect the setting of the locking pin.

Figures 17 and 18 disclose a slight modification of the bearing pad arrangement previously described and in this case the upper bearing pad is provided with a projection 81 over which a U-shaped member 82 may be inserted, thus firmly retaining the bearing pads against separation.

In certain instances it may be desired to eliminate the automatic control feature in which case the movement of the locking pin may be controlled manually and in this connection reference is had to Figures 11 to 14 inclusive. The anchor rod slide block is provided with bolster securing portion 83 from which a box-like projection 84 extends rearwardly to provide a slide and guide for the anchor rod. This box-like projection is provided with aligned spaced bearing portions 86 and an offset bearing portion 87, the latter of which is adapted to rotatably carry operating rod 88. The ends of the operating rod are extended outwardly substantially to the car side and terminate in a handle 89 adjacent an indicating plate 90 carried by the car. The intermediate portion of the control rod has non-rotatably secured thereto a cam 91 which is surrounded by cam block 92 having a projection 93 connected to one end of a safety spring 94. The other end of the safety spring is connected to one end of bearing shaft 96 which is rotatably supported in the aligned bearings 86 and non-rotatably carries at its center portion the pin lifting arm 97 which is pivotally connected to the anchor rod locking pin 98.

The operation of this manually controlled mechanism is very similar to that previously described with the exception that the movement of the pin must be accomplished manually. A rotation of the operating rod 88 will cause the cam 91 to either move the cam block 92 upwardly or downwardly imparting the force to the safety spring 94 which in turn causes movement of arm 97 either lifting or lowering the locking pin 98. With this form it is obvious that the manual control lever may be thrown to either empty or load position regardless of the condition of the brake levers, since any movement will be absorbed by the safety spring without moving the locking pin until such time as the condition of the anchor rod will permit.

The brake mechanism as shown in Figures 19 to 34 inclusive has been modified slightly to permit of its application to freight cars, such as the box or gondola. In such cars the space beneath the center sill is usually unobstructed and may be utilized for application of the foundation brake rigging. Referring first to Figures 19 to 28 inclusive, which disclose the rigging as modified for automatic operation, the brake cylinder 100 is secured by a bracket or other means to the under side of the car center sill R and is supplied with air from a suitable source through pipe 101. The brake cylinder push rod 102 is bifurcated at its outer end to engage the main brake cylinder lever 103 to an intermediate point of which it is pivotally connected as at 104. One end of the main cylinder lever is pivotally connected as at 105 to some portion of the car body, preferably a portion so located or built out, as to permit the location of the lever in a substantially horizontal position. The opposite end of this lever is bifurcated and pivotally connected as at 106 to the load connection rod 107. The end of the load connection rod which is in engagement with the pivot 106 is slotted so as to permit relative movement between the rod and main cylinder lever, while the opposite end of the rod is bifurcated and pivotally connected as at 108 to one end of the equalizing lever 109, the opposite end of the equalizing lever is pivotally connected as at 110 to one end of connection rod 111, the other end of which is connected to the live lever 112 of the truck brake rigging. The intermediate portion of the equalizing lever is pivotally connected as at 113 to one end of center connection rod 114, the other end of which is pivotally connected to floating fulcrum lever 115 (Figs. 33 and 34). One end of the floating fulcrum lever is pivotally connected as at 116 to the car structure, while the other end is pivotally connected to connection rod 117 which in turn is pivotally connected to the live lever 118 on one of the trucks.

An intermediate portion of the main cylinder lever is formed with embossments 120 through which pivot bolt 121 may be inserted and on which is pivotally mounted a pair of auxiliary cylinder levers 122 and one end of each of these levers is pivotally connected as at 123 to the auxiliary or light load connection rods 124, the other end of which is pivotally connected as at 126 to the main or load connection rod. The opposite ends of the auxiliary levers are bifurcated and pivotally connected as at 127 to the spaced arms of forked locking rod 128. In order to prevent interference between the auxiliary and main cylinder levers during relative movement bearing portions 129 and 130 are formed on the main and auxiliary cylinder levers respectively. It is thus seen that any movement of the main cylinder lever will likewise move the auxiliary cylinder levers, but unless the forked locking rod is held the auxiliary cylinder levers cannot transmit any force, in which case the entire cylinder power will act directly upon the main connection rod, but if the forked locking rod is held, then during outward movement of the main brake cylinder lever the auxiliary cylinder levers will pivot about the pin 121 causing the pivots 123 to travel at a faster rate than the pivot 106, thus giving a decreased leverage resulting in less power being applied at the brake shoes. The necessary movement between connection rod 107 and pivot 106 is permitted by the slot in the main or load connection rod. The brake rigging just described is returned to a released position by release spring 131 which is anchored to the center sill by means of bracket 132, while the levers may be operated by means of the usual hand brake connected in the system at some point by means of a chain, such as 133.

In order that the forked locking rod may be returned to its inner or brake released position the end opposite the fork is pivotally connected as at 134 to pull links 136 which are in turn pivotally connected to bell crank 137 mounted for pivotal movement on shaft 138 carried by brackets 140 secured to the car center sill. A torsion spring 141 has one end anchored to the center sill bracket, while the other end is anchored in the bellcrank 137 and is so tensioned as to continually urge the bellcrank and connected locking rod toward the center of the car, thus insuring the return of the locking rod and auxiliary cylinder levers to the released position (Fig. 27).

In order to control the movements of the forked locking rod a casting 142 is provided having portions at right angles to each other by which it may be secured to the car center sill and having other portions spaced from the center sill providing spaced guide portions 143. The spaced guide portions are provided with openings through which the locking pin 144 may be inserted to securely hold the locking rod in position. One end of this locking pin is pivotally connected as at 145 to one end of control arm 146, the other end of which is non-rotatably secured to an end of control rod 147. The control rod is pivotally mounted on the car structure by means of bracket 148 secured to the center sill and bracket 149 preferably secured to a portion of the car bolster. The end of the control rod adjacent bracket 149 has rigidly secured thereto arm 150 which extends outwardly from the rod and is pivotally connected as at 152 to the lower end of push rod 153 which is slotted as at 154 to permit a certain amount of independent motion between the push rod and the arm 150. The arm is provided adjacent its outer end with a pin 156 adapted to project into an open slot 157 formed on toggle member 158. This toggle member is pivoted to the bolster bracket 149 as at 159 and is provided at the end remote from the pivot with a pin or other means 160 to which one end of toggle spring 162 may be secured, the other end being secured to the bracket or some portion of the structure. In order to prevent the complete withdrawal of the locking pin from the guide member a stop 163 is formed on the hub of arm 150 and is adapted to contact a similar stop 164 formed either on the bracket or an adjacent car part. It is thus seen that a downward motion of push rod 153 will cause a slight rotation of control rod 147, while at the same time pin 156 moving downward will carry the toggle member 158 with it. As soon as the toggle member has been carried sufficiently far for the spring tension to be applied below the pivot 159, the spring will snap the toggle member and arm 150 downward completely removing the locking pin from the locking rod. This sudden downward movement of the control arm is permitted due to the slot 154 in the lower end of the push rod. With the parts in the lowered position an upward movement of the arm 150 will cause a duplication of the snap action above referred to. It is thus seen that a considerable movement of rod 153 is possible before the locking pin is removed from its position engaging the locking rod.

In order that the movements of rod 153 may be controlled it is connected at its upper end to one end of vibrating spring 166, the other end of which is secured to the upper end of rod 167, the lower end being pivotally connected as at 168 to U-shaped operating member 169, the ends of which are pivotally mounted on the car bolster by brackets 170, the rod 167 is guided for vertical movement relative to the car bolster by means of bracket 171 against which one end of compression spring 172 abuts, the other end engaging a stop 173 fastened to the rod. This spring is of sufficient strength to urge the entire locking mechanism downward to unlock the locking rod.

The movements of the U-shaped operating member are controlled by means of a bearing pad 174 secured to the upper end of rod 175 which preferably passes through the bolster and is vertically guided thereby. The bearing pad is of sufficient area to permit the control of the operating member regardless of the pivotal position of the truck relative to the car body. The lower end of rod 175 is pivotally connected to one end of bar 176, the intermediate portion thereof being pivotally mounted by bracket 177 projecting from the truck bolster, the opposite end of the bar is pivotally connected to link 178 adjustably carried by the truck side frame as was explained in connection with Figure 4.

With the automatic mechanism as just described, the operation is as follows, assuming the parts to be in the positions as shown in Figures 19 to 25 inclusive: Upon application of a load to the car body the truck bolster will move downwardly compressing the truck springs and moving rod 175 away from the U-shaped operating member permitting the compression spring 172 to move downwardly, thus causing rod 153 to also move downwardly operating the toggle mechanism as previously explained and causing the locking pin 144 to be withdrawn from the locking rod. If the brakes are set at the time that the car body is loaded the vibrating spring 166 will be distorted slightly, while member 175 will be moved downward away from the U-shaped operating member. As soon as the brakes on the now loaded car are released the energy stored in vibrating spring 166 and compression spring 172 will immediately cause operation of the locking mechanism removing the pin from the locking rod and conditioning the rigging for maximum brake application, in which case the linkage is connected as shown in Figure 34. If the car is operating with a light load or empty the linkages will be in the position as described and connected as shown in Figure 33, in which case a reduced braking power is transmitted to the brake shoes.

In the automatic form just described the vertical oscillation of the car body during transit is permitted due to the freedom of connection between rod 175 and the U-shaped operating member and also due to the lost motion between the push rod 153 and the toggle member 158.

In case it is desired to operate the mechanism manually this may be accomplished as shown in Figures 29 to 32 inclusive. In these figures what might be termed the foundation rigging is substantially identical with that just described and, therefore, the same reference numerals have been used. However, the lock operating mechanism is modified and will now be described. In this case the locking rod is slidably carried by a modified supporting bracket 180 carried by the center sill flange. This bracket is provided with a guiding portion through which the locking rod may freely slide when released by the locking pin 181. The upper end of this pin is pivotally connected to one end of crank arm 182, the other end of which is secured to rod 183 carried by spaced bearings 184 formed integral on the supporting bracket. One end of the rod extends outwardly beyond the supporting bearings and has secured thereto one end of safety spring 186, the other end of which is pivotally connected to an arm 187 formed integral with cam block 188. The cam block is mounted upon cam 190 rigidly secured to operating shaft 192 carried by bearing bracket 194 at the center sill and by bearings 196 locked at either side of the car. It is thus seen that rocking of the rod 192 will cause upward or downward movement of the cam follower block, thus causing movement of the safety spring to either raise or lower the locking pin. In cases where the brakes are applied it will be impossible for the pin 181 to be raised, but under such conditions the safety spring will absorb the entire movement of the follower block without damage to the mechanism and will move the pin as soon as the brakes have been released.

It should be especially noted that regardless of any failure of the auxiliary levers and their connections to either the brake rigging or to the car body or of any failure in the locking mechanism the car will still have the main braking power available. This is a very important feature since regardless of the failure of the auxiliary portions the car will still have a brake system of the type now in use on cars.

While the mechanism has been described in more or less detail and illustrated as applied to box cars and hopper cars, it is obvious that various other modifications and uses of the mechanism will be apparent to persons skilled in the art and all such modifications and uses are contemplated as fall within the scope of the following claims.

What is claimed is:

1. A railway car brake including a main cylinder lever fulcrumed on the car and slidably connected to the brake rigging to transmit a braking force of one magnitude, an auxiliary cylinder lever pivotally mounted on the main cylinder lever and directly connected to the brake rigging, means selectively connecting said auxiliary lever to the car for transmitting a braking force of a different magnitude, said means including locking means whereby the braking magnitude transmitted may be preselected.

2. A railway car brake including a main cylinder lever fulcrumed on the car and slidably connected to the brake rigging to transmit a braking force of one magnitude, an auxiliary cylinder lever pivotally mounted on the main cylinder lever and directly connected to the brake rigging, means connecting said auxiliary lever to the car and providing a fulcrum for the lever whereby a braking force of a different magnitude may be transmitted to the rigging, and locking means operable independently of the brake rigging for effecting the connection of said first named means to the car whereby the braking magnitude to be transmitted may be preselected.

3. A railway car brake including a main cylinder lever fulcrumed on the car and slidably connected to the brake rigging to transmit a braking force of one magnitude, an auxiliary cylinder lever pivotally mounted on the main cylinder lever and directly connected to the brake rigging, means selectively connecting said auxiliary lever to the car for transmitting a braking force of a different magnitude, said means including locking means automatically operable by the net weight of the car whereby the braking magnitude transmitted may be preselected.

4. A railway car brake including a main cylinder lever fulcrumed on the car and movably connected to the brake rigging to transmit a braking force of one magnitude, an auxiliary cylinder lever pivotally mounted on either side of the main cylinder lever and each being directly connected to the brake rigging, means pivotally connected to the auxiliary cylinder levers and slidably carried by the car, and locking means operable to connect said first named means to the car whereby the auxiliary levers may transmit a braking force for a different magnitude.

5. A railway car brake including a main cylinder lever fulcrumed on the car and movably connected to the brake rigging to transmit a braking force of one magnitude, an auxiliary cylinder lever pivotally mounted on either side of the main cylinder lever and each being directly connected to the brake rigging, means pivotally connected to the auxiliary cylinder lever and slidably carried by the car, and locking means operable to connect said first named means to the car whereby the auxiliary levers may transmit a braking force of a different magnitude, said locking means being automatically operable by the net weight of the car.

6. A railway car brake including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and slidably carried by the car, locking means operable to connect said first named means to the car whereby the auxiliary lever may transmit a braking force of a different magnitude, and control means for said locking means permitting preselection of the braking magnitude independently of the position of the brake rigging.

7. A railway car brake including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and slidably carried by the car, locking means operable to connect said first named means to the car whereby the auxiliary lever may transmit a braking force of a different magnitude, and control means for said locking means including a resilient member that may be biased to predetermined positions thereby permitting preselection of the braking magnitude independently of the position of the brake rigging.

8. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the average truck spring movement for automatically selecting the proper braking magnitude to be transmitted in accordance with the net weight of the car.

9. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the average truck spring movement for automatically selecting the proper braking magnitude to be transmitted in accordance with the net weight of the car, said control means including lost motion devices preventing operation of the locking means by vibratory truck spring movements.

10. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the average truck spring movement for automatically selecting the proper braking magnitude to be transmitted in accordance with the net weight of the car, said control means including resilient portions permitting a conditioning of the locking means independently of the position of the brake rigging.

11. A railway car brake including a brake cylinder and piston, a main cylinder lever fulcrumed on the car and pivotally connected to the piston for actuation thereby, said lever being movably connected to the brake rigging to transmit a braking force of one magnitude, an auxiliary cylinder lever pivotally mounted on the main cylinder lever and directly connected to the brake rigging, and means selectively connecting said auxiliary lever to the car for transmitting a braking force of a different magnitude upon movement of the main cylinder lever.

12. A railway car brake including a brake cylinder and piston, a main cylinder lever fulcrumed on the car and pivotally connected to the piston for actuation thereby, said lever being movably connected to the brake rigging to transmit a braking force of one magnitude, an auxiliary cylinder lever pivotally mounted on the main cylinder lever and directly connected to the brake rigging, and means selectively connecting said auxiliary lever to the car for transmitting a braking force of a different magnitude upon movement of the main cylinder lever, said means including locking means automatically operable by the net weight of the car whereby the braking magnitude to be transmitted may be preselected.

13. A railway car brake including a main cylinder lever fulcrumed on the car, an auxiliary cylinder lever pivotally mounted on the main cylinder lever and directly connected to the brake rigging, and means anchoring one end of the auxiliary lever to the car whereby the auxiliary lever will pivotally move to transmit a braking force to the rigging during movement of the main cylinder lever.

14. A railway car brake including a brake cylinder and piston, a main cylinder lever fulcrumed on the car and pivotally connected to the piston for actuation thereby, said lever being movably connected to the brake rigging to transmit a large braking force, an auxiliary cylinder lever pivotally mounted on the main cylinder lever and directly connected to the brake rigging, anchor means securing one end of the auxiliary lever to the car whereby the auxiliary lever will pivotally move to transmit a reduced braking force to the rigging during movement of the main cylinder lever, and locking means operable to release the anchor means whereby the auxiliary lever is rendered inoperative thereby permitting application of the large braking force by said main cylinder lever.

15. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the truck spring movement of the stationary car for automatically selecting the proper braking magnitude to be transmitted.

16. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the spring movement of the stationary car for automatically selecting the proper braking magnitude to be transmitted, said control means including lost motion devices preventing operation of the locking means during travel of the car by vibratory truck spring movements.

17. A railway car brake for cars spring mounted on trucks including a main cylinder lever fulcrumed on the car and movably connected to the brake rigging to transmit a braking force of one magnitude, an auxiliary cylinder lever pivotally mounted on the main cylinder lever and directly connected to the brake rigging, means connected to the auxiliary cylinder lever and movably carried by the car, locking means operable to connect said first named means to the car whereby the auxiliary lever may transmit a braking force of a different magnitude, and control means for said locking means operable by the truck spring movement of the stationary car for automatically selecting the proper braking magnitude to be transmitted, said control means including resilient portions permitting a conditioning of the locking means independently of the position of the brake rigging.

18. An empty and load brake for railway cars comprising in part, a first leverage system for transmitting a braking force of one magnitude, a second leverage system for transmitting a braking force of a different magnitude, one of said leverage systems being fulcrumed on the car, and means automatically operable to select the proper braking magnitude to be transmitted, said means including a rod and lever connection between the truck frame and truck bolster to transmit the relative motion therebetween to the remainder of said means.

19. An empty and load brake for railway cars comprising in part, a first leverage system for transmitting a braking force of one magnitude, a second leverage system for transmitting a braking force of a different magnitude, one of said leverage systems being fulcrumed on the car, and means automatically operable to select the proper braking magnitude to be transmitted, said means including a rod and lever connection between the truck frame and truck bolster to transmit the relative motion therebetween to the remainder of said means and said means also including lost motion devices between the truck bolster and car body bolster.

20. An empty and load brake for railway cars comprising in part, a first leverage system for transmitting a braking force of one magnitude, a second leverage system for transmitting a braking force of a different magnitude, one of said leverage systems being fulcrumed on the car, and means operable to pre-select the proper braking magnitude to be transmitted, said means including resilient portions permitting a conditioning of the means independently of the position of the leverage systems.

21. An empty and load brake for railway cars comprising, a first leverage system including a lever fulcrumed on the car, a second leverage system including a lever having means releasably anchoring one end thereof to the car, said leverage systems being independently operable to transmit braking forces of different magnitudes, and control means for said releasable anchor means operable to select the proper braking magnitude to be transmitted.

22. An empty and load brake for railway cars comprising in part, two leverage systems each operable to transmit a braking force of different magnitudes, one of said leverage systems including a lever having a releasable fulcrum, and means automatically operable in accordance with the net weight of the car to anchor or release said fulcrum whereby the proper braking magnitude to be transmitted may be preselected.

23. A railway car brake including a main cylinder lever, an auxiliary cylinder lever pivotally mounted on the main cylinder lever and having one end thereof releasably anchored to the car, said main cylinder lever and said anchored auxiliary lever being operable to transmit braking forces of different magnitudes independently of each other, and means automatically operable to select the proper braking magnitude to be transmitted, said means including locking means operable to release said auxiliary lever.

ROBERT W. JOY.